US012559193B2

(12) United States Patent
    Catchpole

(10) Patent No.: US 12,559,193 B2
(45) Date of Patent: Feb. 24, 2026

(54) BICYCLE HANDLEBAR

(71) Applicant: Velobike Innovation Limited, Cambridge (NZ)

(72) Inventor: Glenn Catchpole, Cambridge (NZ)

(73) Assignee: Sofa Brand, LLC, Denver, CO (US)

( * ) Notice: Subject to any disclaimer, the term of this patent is extended or adjusted under 35 U.S.C. 154(b) by 0 days.

(21) Appl. No.: 18/791,170

(22) Filed: Jul. 31, 2024

(65) Prior Publication Data
    US 2025/0042499 A1        Feb. 6, 2025

Related U.S. Application Data

(60) Provisional application No. 63/516,850, filed on Jul. 31, 2023.

(51) Int. Cl.
    *B62K 21/12*        (2006.01)
    *B62K 21/26*        (2006.01)

(52) U.S. Cl.
    CPC .............. *B62K 21/12* (2013.01); *B62K 21/26* (2013.01)

(58) Field of Classification Search
    CPC ....... B62K 21/12; B62K 21/125; B62K 21/26
    USPC ......................................................... D12/178
    See application file for complete search history.

(56) References Cited

U.S. PATENT DOCUMENTS

| | | | | |
|---|---|---|---|---|
| 4,503,729 A | * | 3/1985 | Shimano ................ | B62K 21/12 |
| | | | | D12/178 |
| 6,546,827 B2 | * | 4/2003 | Irie ........................ | B62K 21/12 |
| | | | | 74/551.9 |

| | | | | |
|---|---|---|---|---|
| D727,132 S | * | 4/2015 | D'Aluisio ...................... | D8/303 |
| 10,293,879 B1 | * | 5/2019 | Killing .................... | B62K 19/32 |
| 10,457,347 B2 | * | 10/2019 | Chiang ..................... | B62K 3/00 |
| 11,420,705 B2 | * | 8/2022 | Smallwood ............ | B62K 21/26 |
| 11,530,013 B2 | * | 12/2022 | Smallwood ............ | B62K 21/12 |
| 11,919,601 B2 | * | 3/2024 | Sheff ........................ | B62J 11/00 |
| 12,296,913 B2 | * | 5/2025 | Burrow .................. | B62K 21/26 |
| 2004/0045132 A1 | * | 3/2004 | Chen ....................... | B62K 21/12 |
| | | | | 16/430 |
| 2004/0231451 A1 | * | 11/2004 | Chiang .................. | B62K 21/12 |
| | | | | 74/551.1 |

(Continued)

FOREIGN PATENT DOCUMENTS

| | | | | | |
|---|---|---|---|---|---|
| WO | WO-2016029927 A1 | * | 3/2016 | ............ | B62K 21/12 |
| WO | WO-2022096866 A1 | * | 5/2022 | ............ | B62K 21/12 |
| WO | WO-2025037080 A1 | * | 2/2025 | | |

*Primary Examiner* — Adam D Rogers
(74) *Attorney, Agent, or Firm* — Heuton IP Law, LLC

(57)        ABSTRACT

Aspects relate to drop handlebar assemblies including a central body which may be integrally formed with carbon fiber. The central member may include a pair of opposing drop bodies. Drop bodies may initially extend away from the central body in divergent directions with respect to a horizontal plane. Drop sections may have an initial top surface comprising a proximal channel and a distal support structure. Drop sections may include a front surface comprising a recessed convex portion proximate to a respective transition zone and further comprise a non-recessed convex portion. One or more embodiments may include a plurality of pairs of grips configured for selective engagement with drop bodies. On one embodiment, a handlebar assembly consists of the central member and a selectively engaged pair of grips (along with any fastening mechanisms). Selected grips may be suited to a user's intended use or comfort preference.

19 Claims, 11 Drawing Sheets

(56)         References Cited

U.S. PATENT DOCUMENTS

2009/0013819 A1 *    1/2009  Nicol ...................... B62J 17/02
                                                74/551.8

* cited by examiner

BICYCLE HANDLEBAR

This application claims the benefit of and priority to U.S. Provisional Patent Application No. 63/516,850, filed on Jul. 31, 2023, the entire contents of which are hereby incorporated herein by reference. Applicant also references pending design patent applications U.S. Design Pat. Nos. 29/943,200 and 29/943,202, the entire contents of which are hereby incorporated herein by reference.

BACKGROUND

Field

Aspects of the present disclosure relate to improved human powered vehicle performance. Specifically, aspects relate to handlebar assemblies with improved structure and grip configurations.

Description of Related Art

Humans have continually sought to increase the efficiency, comfort, and speed of various modes of transportation. Likewise, sports have been a large factor in technological advancements. These facts are especially apparent with the development of bicycles or other human-powered vehicles. Bicycles are not only enjoyed by millions for sport, as evidenced by the popularity of Tour de France and other competitions, but also are relied on by a large portion of the world as a reliable mode of transportation. As part of these technological innovations, drop handlebars were developed to allow the rider to be positioned in a more aerodynamic manner (often referred to as the "aero position" by competitive riders) by allowing the user's head to be more level with respect to the chest in a manner that also provided a lower center of gravity. Many racing and hybrid bikes have adopted drop handlebars for their excellent advantages. Unfortunately, however, the Earth is not flat, and some riders must routinely embark on vertically oriented paths in which long periods in the aero position caused by traditional drop handlebars results in muscle fatigue, discomfort, and additional work as the user struggles with the bar's grips to traverse the intended path.

Several attempts have been made to remedy these deficiencies, such as creating combination handlebars. Some variations would allow users to bolt on a single handlebar that had the full drop handlebar as well as a regular handlebar within a single piece. These, however, created extra weight, loss of aerodynamic profiles, and, in certain embodiments, issues of mounting brakes and gearing, amongst other issues. Other variations allow users to bolt on extensions around the central axis of the drop handlebar, however, these were prone to damaging and/or slipping from mounted location around the central axis, not being located at the ideal location, and variations of the problems identified above. Further problems were encountered when mounting modifications around the axis would force relocation of the control surfaces, such as braking and shifting actuators. Still further attempts were made to swap out entire handlebars, however, this resulted in economically unfeasible outcomes which forces users to purchase multiple handlebars, and many times required trial and error with additional stems to ensure proper configuration and fit. What is needed therefore are solutions that address one or more of these deficiencies.

SUMMARY

Aspects of this disclosure relate to drop handlebar assemblies configured to be removably mounted on a human-powered vehicle. In one embodiment, the assemblies may be configured to be mounted on a bicycle, yet other vehicles are envisioned. Drop handlebar assemblies may include a central body which extends along a first horizontal axis for a first length from a first end and an opposing second end. The central body may be a single contiguous piece. In one embodiment, the central body comprises or consists of carbon fiber. The central body may generally be characterized by a homogenous composition. The central body may include a midsection along the length for ease of being removably mounted to a vehicle frame. The central member may include a pair of opposing drop bodies. Depending on the embodiment, the drop bodies may be characterized by having a first having a transition section and a drop section.

In one embodiment, a first drop body may comprise a transition section extending from the central body along a first horizontal direction that is away from the length of the central body. A corresponding drop section of the same drop body may extend from a distal end of the transition section in a downward vertical direction. A second drop body may oppose the first drop body with respect to the length of the central member. A second drop body may have a transition section and a drop section, in which the transition section extends away from the length of the central member. The second transition section may extend along a direction that is parallel with the first transition section, yet in other embodiments, the first transition section extends in a direction that is divergent from the second transition section with respect to a horizontal plane parallel with a ground surface. A drop section of the second drop body may traverse in a downward direction, which may be divergent from the drop section of the first drop body with respect to a vertical plane parallel with the horizontal axis. Despite being divergent, the respective drop bodies may have similar or identical masses and/or volumes.

Each transition section may have a top surface comprising a proximal channel and a distal support structure. Each of the drop sections may include a front surface comprising a recessed convex portion proximate to a respective transition zone and further comprise a non-recessed convex portion distally located from the respective transition section. One or more embodiments may include a plurality of pairs of grips. Each pair may be configured for selective engagement with drop bodies to form an operating handlebar assembly. On one embodiment, a handlebar assembly consists of the central member and a selectively engaged pair of grips (along with any fastening mechanisms). The selected grips may be suited to a user's intended use or comfort preference. In one embodiment, each of a first pair of grips may comprise a proximate rear surface configured to be received within the channel of the respective transition zone of the central member, such that a rear portion of a top surface of the grip abuts with the respective end of the central body, such that it forms a continuous outer surface. The pair of grips may further comprise a distal rear surface configured to be received by the convex portion of the respective drop section, such that a distal stop surface makes a continuous outer perimeter with the adjacent portion of the drop section.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIG. 1A is a perspective side view of an example central member along its length, FIG. 1B is a top view of the example central member, and FIG. 1C is a second perspective side view depicting features related to example transition and drop sections of the central member in accordance with various embodiments of the invention;

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
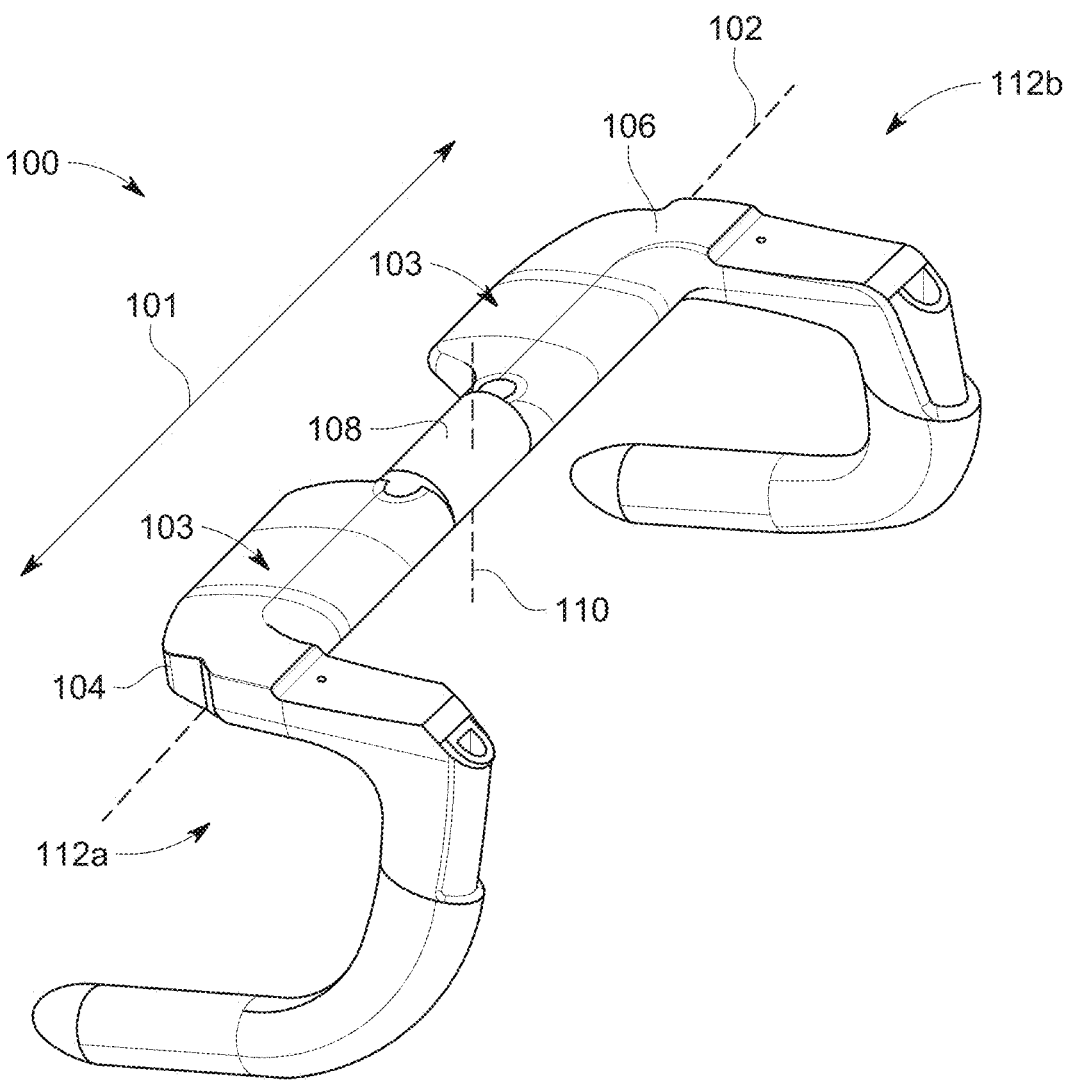
FIGS. 1A-1C depict an example of a central member of a handlebar assembly in accordance with various embodiments of the invention. Specifically.

Aspects of the innovation relate to a drop handlebar assembly configured to be removably mounted on a human-powered vehicle. Drop handlebar assemblies described herein may comprise a central body, such as central body 100 shown in FIG. 1A. Example central body 100 is depicted as an elongated member extending along a first horizontal axis 102. In one embodiment, axis 102 may be parallel with a ground plane or other flat surface. Central body 100 extends along a length 101 from a first end 104 to an opposing second end 106. A top surface 103 extends across length 101. In one embodiment, length 101 may be about 250 mm, yet in other embodiments, length 101 may be about above 250 mm but less than 315 mm. In one embodiment, length 101 with respect to the top surface 103 is about 85-90% of the total length of any portion (inclusive of any extensions or components) of a complete handlebar assembly for which central body 100 is a part of along a horizontal plane parallel with axis 110. In another embodiment, length 101 of top surface 103 is about 310 mm and the longest portion of the handlebar assembly (inclusive of dropdown handlebar sections or components described herein) is about 350 mm.

Illustrative central body 100 is further characterized by a region about the center of the length between the first end 104 and second end 106, such as midsection 108, configured to be removably mounted to a portion of a vehicle frame (not shown). In one embodiment, central body 100 may be configured to rotate around a vertical axis, such as central vertical axis 110, when mounted to a frame (not shown). Central vertical axis 110 may be along a vertical plane oriented perpendicular to the first horizontal axis 102. Midsection 108 is shown as having a generally circular cross section and thus considered tubular along its length respective to the direction of axis 102. In one embodiment, midsection 108 is the only portion of the entire length 101 of central body 100 having a circular cross section. In one embodiment, midsection is about 45-55 mm in length. In yet another embodiment, midsection 108 is 50 mm. In certain implementations, midsection is about 20% of length 101. In another embodiment, midsection is no more than 20% of length 101. In still yet further embodiments, the portion of central body 100 along length having a circular cross section is between 15% and 20%.

In some embodiments, central body 100 may be characterized by having a non-circular cross section along a majority of length 101. As shown, central body 100 may comprise an oval-like cross-section along a portion of its length. Top surface 103 may be more planar than other surfaces of central body 100. Top surface 103 may be asymmetrical with respect to its distribution across the length 101. For example, FIG. 1B is a top view of central body 100. As seen in FIG. 1B, top surface 103 has varying widths 105 (105a-105d) which is perpendicular to length 101. Widths 105 is determined as the distance between a leading edge 107 and a trailing edge 109 along an axis perpendicular to axis 102 (shown in FIG. 1A).

As seen in FIG. 1B, leading edge 107 is generally linear in a direction parallel with length 101 absent its transition to and from midsection 108 in which it traverses closer inward towards axis 102. The outer ends of leading edge 107 generally terminate as the dropdown sections 112a/112b start to extend out. In one embodiment, width 105b is about 30 mm. In one embodiment, widths 105b and 105c are about the same width as the cross-sectional distance of midsection 108. In one embodiment, widths 105b and 105c are both about 30 mm. In certain implementations, widths 105b and 105c are each about 9-11% of length 101. In one embodiment, widths 105e and 105f represent the closest that trailing edge comes towards an inner region of central body 100 and thus represent the shortest widths. In one embodiment, widths 105e and 105f are no more than 7% of length 101. In one embodiment, the shortest width (e.g. widths 105e and 105f) of top surface are shorter in distance than the cross-sectional distance across midsection 108.

Widths 105a and 105d are shown as being the longest widths 105 between the leading edge 107 and trailing edge 109 (portions of member not having a leading edge 107 due to the presence of dropdown sections 112 are excluded). As further shown in FIG. 1B, widths 105b and 105c are shown as shorter than widths 105a and 105d as trailing edge 109 generally points inward towards the center. In one embodiment, trailing edge 109 may terminate or become one with a surface of midsection 108.

However, trailing edge 109 is shown as being asymmetrical with respect to its path from first end 104 to midsection 108 compared with its path from second end 106 and midsection 108. Specifically, as trailing edge 109 extends away from midsection 108 along either direction, width 105 increases at different rates. For example, despite width 105b and 105c being about equal, their respective distances to midsection 108 are different (105c is closer). Further, the rate of increasing width is different. For example, the distance (when measured along a direction parallel with length 101) to obtain maximum width (such as for example widths 105*a* and 105*d*) from the closest respective edge of the midsection 108) differs. For example, width 105*a* may be 25 mm from the closest edge of the midsection 108 when measured along a direction of length 101, and yet width 105*d* may be 10 mm. In one embodiment, the slope of trailing edge 109 on one side extending away from midsection 108 averages 2.5× the other side. In one embodiment, the reduced area resulting from the asymmetrical trailing edge 109 (such as the reduced area due to trailing edge 109 between widths 105*e* to 105*a* is configured to allow the placement of a human thumb to enter the area while one or more the remaining fingers remain gripped to central body 100. In one embodiment, one of width 105*a* or 105*d* is about 55-60 mm and is 10 mm from the closest edge of the midsection 108 when measured along a direction perpendicular to axis 102, and the other of width 105*a* or 105*d* may be 25 mm from its closest edge of midsection 108 when measured along an opposing direction that is also perpendicular to axis 102. In one embodiment, when viewed from the top view (such as illustrated by FIG. 1B), the left side of the central body 100 has a reduced volume as compared to the right side due to the asymmetric differences in the trailing edge 109 described herein. This may be advantageous in certain situations, such as when conducting what is known by competitive track riders as the "Madison Sling." For example, such an embodiment would allow the rider to have just enough room to wrap their thumb of their left hand around the central body 100 in into the available void while still having enough area on the central body 100 to allow the left hand's palm to remain on top surface 103 of central body 100 for support. Having the sufficient void to place the thumb and ample support for the palm proximate to the midsection 108 allows the user to have increased control over prior art handlebars and allow the user to transfer energy to their teammate in a more stable and safe manner. Whereas prior art handlebars required the rider to rest their hand on a dropdown bar which greatly decreased stability and control. Those skilled in the art will understand that this illustrative example is non-limiting and other embodiments may have other variations.

Central body 100 further comprises two opposing notches or carve outs at its first end 104 and second end 106, respectively. Such opposing notches or carve outs permit a user's hand and/or wrist to fit comfortably when the user uses the lowest portion of the drop down portions.

A handlebar body, such as central body 100, may comprise two drop portions, such as drop sections 112. In one embodiment, central body 100 and drop portions 112*a*, 112*b* may comprise a carbon fiber material. In certain embodiments, central body 100 and drop portions consist of carbon fiber materials. In the depicted embodiment, both central body 100 and drop portions 112*a*, 112*b* are formed as single integral component without any securement mechanisms holding them together other than the materials comprising the component structure itself. Central body 100 may comprise one or more materials, such as metals (e.g., aluminum) and/or plastics in certain variations.

Figure 1B:
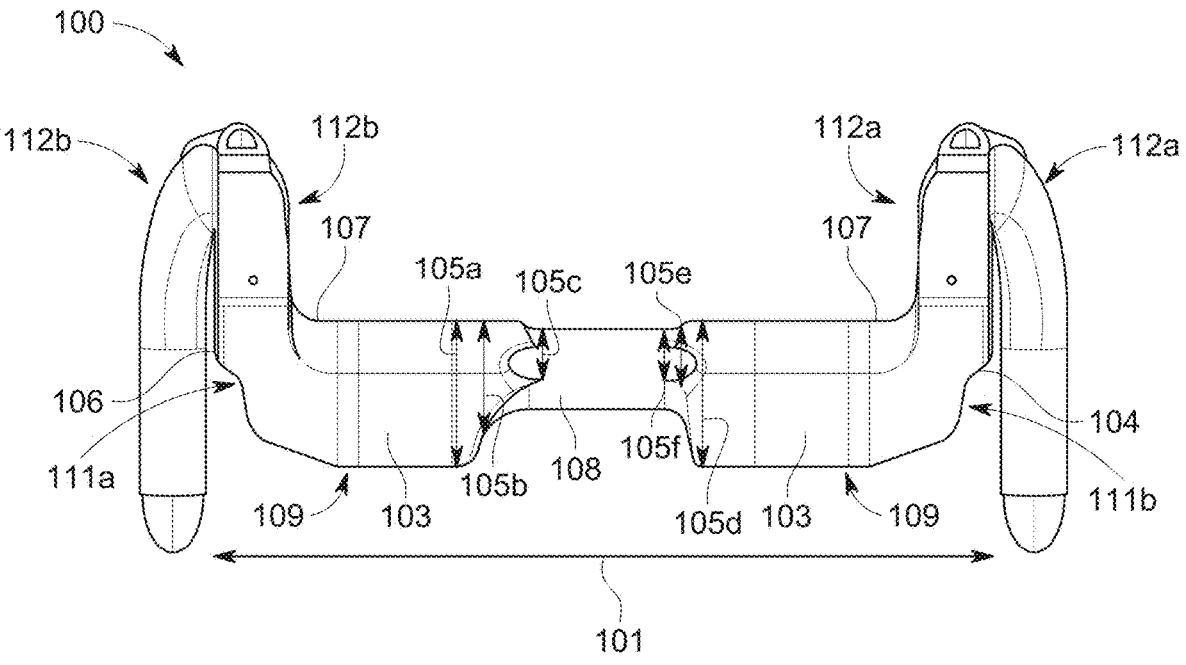
Figure 1C:
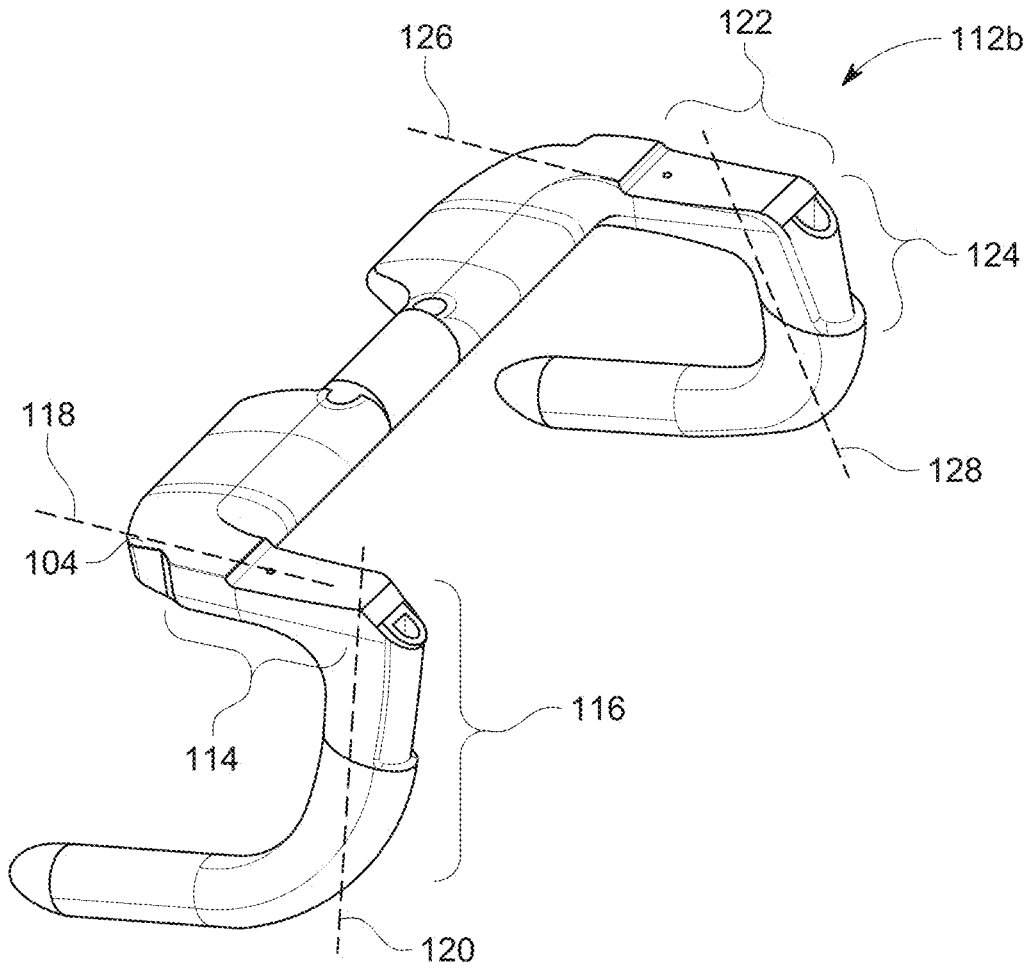

FIG. 1C shows features of an embodiment with two drop down portions, which may be similar or the same as drop down portions 112*a*, 112*b* shown in FIG. 1A. For example, a first drop body (e.g., 112*a*) may include a transition section, such as transition section 114 and a drop section, such as drop section 116. In one embodiment, the transition section 114 may be integrally formed and extending from the first end 104 of the central body 100 along a first direction of a second horizontal axis (e.g., see axis 118) that is incongruent with the first horizontal axis (axis 102 shown in FIG. 1A). In one embodiment, transition section 114 is perpendicular to the first horizontal axis 102. In other embodiments, transition section 114 is substantially perpendicular (e.g., within 10 degrees perpendicular) with respect to the first horizontal axis 102. In certain embodiments, transition section is substantially linear with respect to its direction along an axis (e.g., axis 118) and yet other embodiments, transition section may have bends or curves with respect to one or more horizontal and/or vertical axes. Additional details of example transitions zones are described in further detail later in this disclosure.

As shown in FIG. 1C, a drop section, such as drop section 116, may connect to a distal end of the transition section 114, and traverse in a downward direction with respect to its orientation to the central body 100. For example, in the illustrated example, drop section 116 traverse down vertically oriented axis (e.g., axis 120). As used herein, a vertically oriented axis is an axis having at least a slope of 2:1. In one embodiment, the axis of the direction of transition section 116 is within 30 degrees of the vertical axis 110 (shown in FIG. 1A). In another embodiment, the axis of the direction of transition section 116 may be parallel with vertical axis 110.

Central body 100 is further shown to include a second drop body (which could be comparable or identical to dropdown portion 112*b*) having a transition section 122 and a drop section 124. As shown, transition section 122 is integrally formed and extending from the second end 106 of the central body 100. Transition section 122 extends along a first direction of a third horizontal axis (axis 126) incongruent with the first horizontal axis (e.g., axis 102). In one embodiment, the second horizontal axis 118 is parallel to the third horizontal axis 126. In yet another embodiment, the second horizontal axis 118 is an opposing angle to the third horizontal axis 126 with to a central vertical axis (e.g., axis 110). In still yet another embodiment, the transition section 114 and transition section 122 extend along a horizontal plane that is perpendicular to a vertical plane defined by the central vertical axis 110. Transition section 114 and 122 may comprise identical volumes.

A second drop section, such as drop section 124, may connect to a distal end of the transition section 122, and traverse in a downward direction with respect to its orientation to the central body 100. For example, in the illustrated example, drop section 120 traverse down vertically oriented axis (e.g., axis 128). In one embodiment, the axis of the direction of transition section 116 is within 30 degrees of the central vertical axis 110 (shown in FIG. 1A). In another embodiment, the axis of the direction of transition section 116 may be parallel with vertical axis 110.

Figure 2:
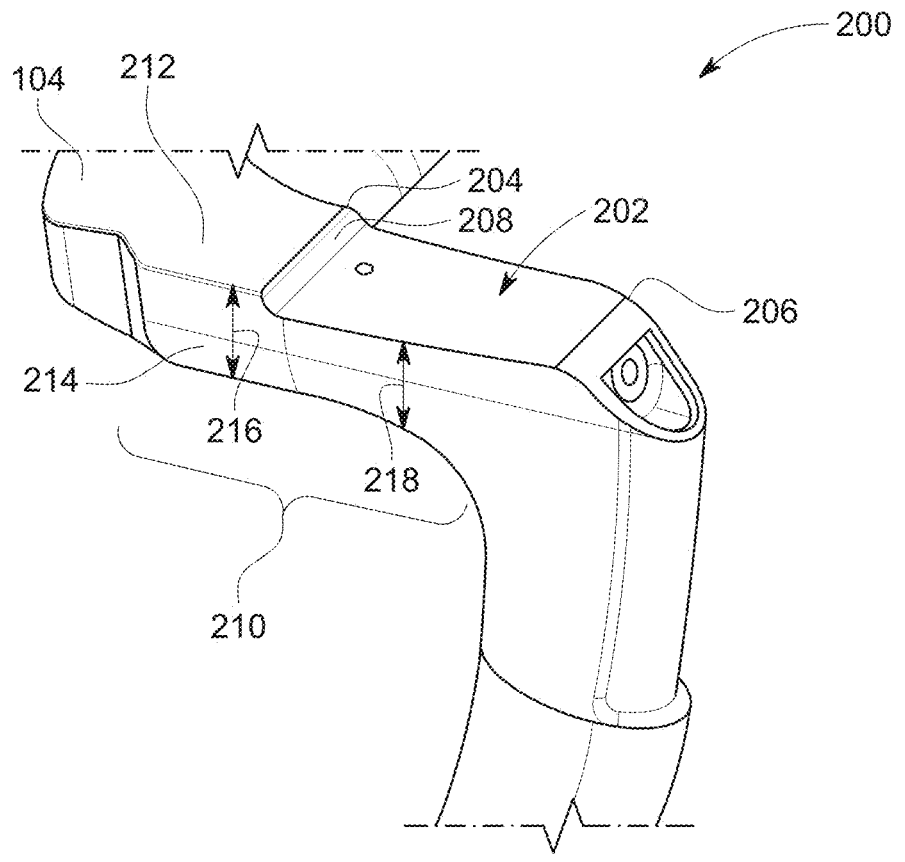
FIG. 2 is an enlarged perspective view of a transition section of a central member according to certain embodiments of the invention.

FIG. 2 is a perspective view of a drop-down body according to certain embodiments. For ease of understanding, only a single drop-down portion 200 is depicted, however, those skilled in the art with the benefit of this disclosure will appreciate that two opposing drop-down portions may be utilized on a central member, such as central body 100 shown in FIG. 1A. Further, drop-down body 200 may be similar or identical to drop-down portion 112*a* shown in FIG. 1A. As shown in FIG. 2, drop-down body 200 has a top surface, such as top surface 202. Top surface 202 extends along a length from a proximate end 204 to a distal end 206. Proximate end 204 may be located proximally to the respective first or second end of a central member (e.g., ends 104, 106 shown in FIG. 1). In one embodiment, proximate end 204 comprises a channel, such as channel 208. Channel 208 may be substantially perpendicular (within 10 degrees from perpendicular) with respect to a centerline formed by the length of the top surface 202 between the proximate and distal ends (ends 204 and 206). In one embodiment, channel 208 is perpendicular to the length of the top surface with respect to ends 204 and 206. In one embodiment, the length is parallel to the second horizontal axis 118 shown in FIG. 1A.

In certain embodiments, regardless of the presence of transition sections, drop-down portion 200 may be characterized by a structure (e.g., structure 210) extending in a direction away from axis 102 of central body 100. For example, it may extend a direction generally perpendicular to axis 110 (shown in FIG. 1A). Structure 210 may include a channel (e.g., channel 208) separating a first top surface, such as top surface 212 located at or near the first end 104. Top surface 212 is shown as having a first height from a bottom surface 214 to form a first thickness (e.g., thickness 216) and a second top surface, such as surface 202, having a second height with respect to the first top surface 212. In certain embodiments, top surface 202 has a height from bottom surface 214 to create a second thickness 218 that differs from thickness 216. As shown in the illustrative example in FIG. 2, first thickness 216 is greater than second thickness 218. Top surface 202 may be characterized by a different surface contouring with respect to top surface 212. Top surface 202 may be planar in certain embodiments. As explained later, top surface 212 may comprise or serve as a securing structure for one or more selectable grips.

Figure 3:
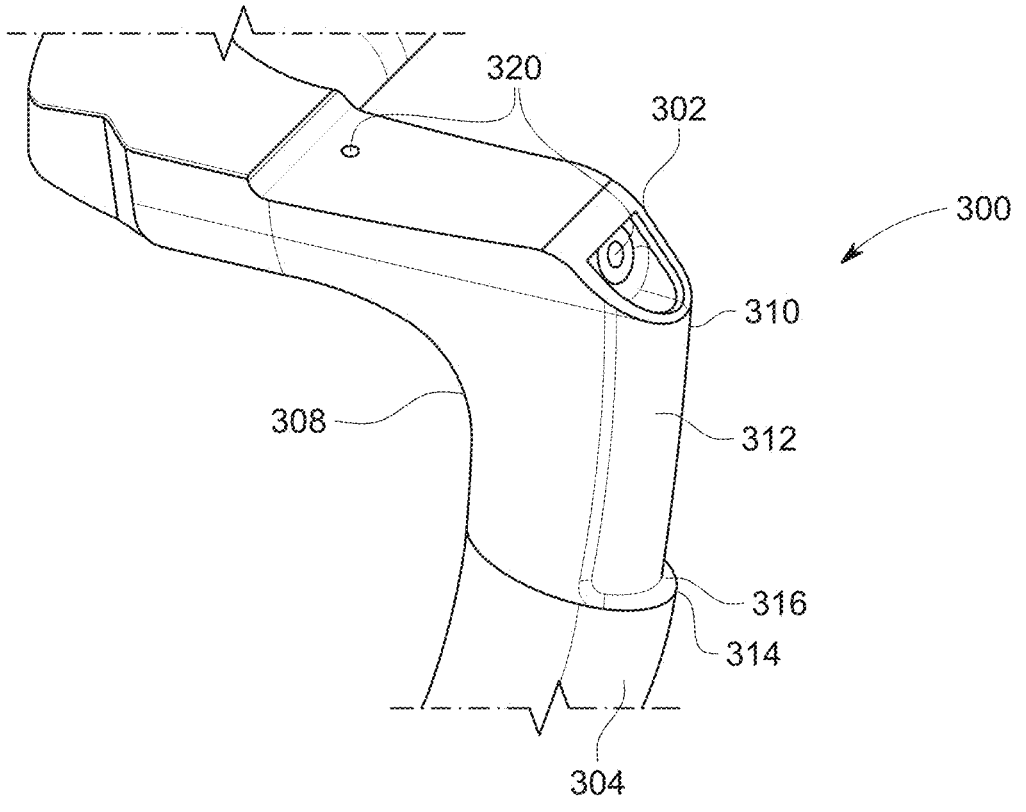
FIG. 3 is an enlarged perspective view of a drop section of a central member according to various embodiments of the invention.

In further embodiments, regardless of any defined drop sections or regions, drop-down portions, such as portion 200 of FIG. 2, may comprise a distal structure. FIG. 3 shows a distal structure extending from a portion of a central member that comprises a section extending in a downward position in accordance with one embodiment. As shown, distal structure 300 extends a length 301 in a downward direction from a first end 302 towards a second end 304. The first end 302 is shown as abutting end 206 from structure 200 shown in FIG. 2. In this regard, although structures 200 and 300 are described in different figures for ease of showing various components, they may both be part of a single integral structure as explained in reference to FIGS. 1A-1C. In this regard, in certain embodiments structures 200 and 300 may have substantially the same composition of materials with respect to their structural components.

Structure 300 has a thickness (e.g., thickness) from a bottom surface 308 to a front surface 310. Example bottom surface 308 may be curved, and as such, a thickness may vary along the length of structure 300. Font surface 310 may comprise a recessed convex portion 312 at least along the portion of the length. In one embodiment, the recessed convex portion 312 terminates at around an apex of an arch created by an outer-most surface of the structure 300, such as apex 314. In one embodiment, the recessed convex portion 312 of surface 310 is located proximate to end 302 but is not present at a more distal end, such as end 304.

The location of recessed convex portion 312 may create a channel, such as channel 316. Channel 316 may be present along a recessed perimeter extending along two opposing sides of structure 300. Channel 316 may traverse across front surface 310 to continue along the two opposing sides. In the illustrated embodiment, channel 316 traverses across the front surface in a manner to create a boundary between recessed convex portion 300 and lower frontal surface 318, in which lower frontal surface may be the outermost surface of structure 300. As shown in FIG. 3, either structure 200 or structure 300 may contain one or more fastening structures, such as structures 320. Such structures may contain voids, recessed, threaded inserts, snap connections, friction fit protrusions, and/or areas of thinner density for receiving one or more fasteners. One claimed embodiment may be the central body 100 as substantially shown in FIGS. 1-3.

Figure 4:
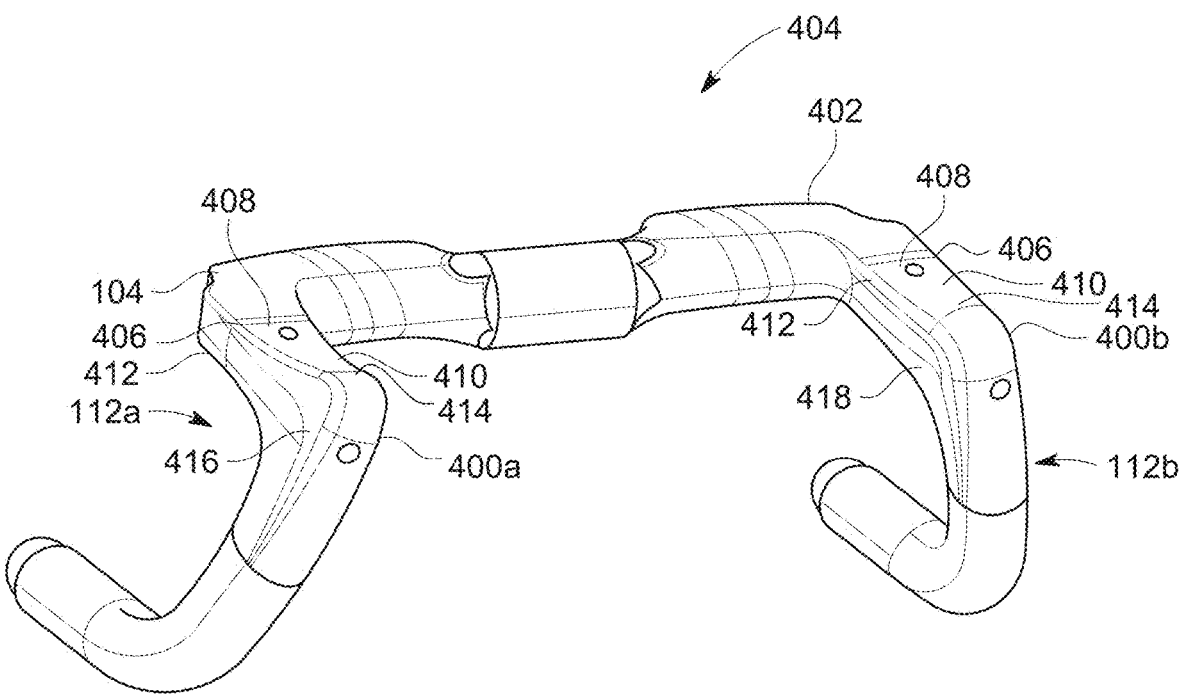
FIG. 4 is a perspective view of a dropdown handlebar assembly in accordance with various embodiments of the invention.

Further aspects relate to an assembly having a plurality of grips. FIG. 4 is a perspective view of an example pair of grips that may be selectively engaged with a central member in accordance with certain embodiments. Specifically, FIG. 4 shows a pair of grips (grips 400a/400b) located on opposing ends of a central member 402, which may be similar to one or more central members disclosed herein. FIG. 4A shows features associated with a proximal portion of the example grips and FIG. 4 shows features associated an example distal portion of the example grips. Looking to FIG. 4, grips 400a/400b, may be configured to be selectively engaged with corresponding drop bodies to form an operating handlebar assembly, such as assembly 404. Grips 400 may be a first pair of grips from a plurality of pairs of grips, such as the pair of grips shown in FIG. 5. In one embodiment, a plurality of grips may be provided with a central body in a kit, such as to allow an end user to selectively engage pairs of grips based upon their use or comfort.

Grips 400 may comprise a proximate rear surface (e.g., surface 406) configured to be received within a channel located on central member 402, such as channel 208 of the respective transition section 114, shown in FIG. 2. In one embodiment, rear surface 406 is receivable in the channel such that a rear portion 408 of a top surface 410 of the grip 400 abuts with the respective end of the central body, such as ends 104 and 106, such that it forms a continuous outer surface. In one embodiment, a portion of top surface 410 is lined up with the top surface of the adjacent end of the central member 402 with respect to a horizontal plane, such that both the adjacent surface of the central member 402 and the immediately adjacent portion of the top surface 410 are on the same horizontal plane. In one embodiment, a proximate portion 412 of the top surface 410 is flat with respect to the horizontal plane. In one embodiment, at least a quarter of the length of the top surface 410 from the proximate portion to a distal portion is flat. In one embodiment, at least a predetermined distance of the top surface 410 from the proximate portion is flat.

As seen in FIG. 4, the distal portion 414 of the top surface is elevated with respect to the proximate portion 412 with reference to the horizontal axis defined by a flat ground surface. In one embodiment, at least a portion of an outer wall (e.g., wall 416) of grips 400 is angled towards a central interior region of assembly 404. A portion of outer wall 416 may be angled at a predetermined angle with respect to the underlying portion of member 402 below it. In another embodiment, outer wall 416 may be angled at a predetermined angle with respect to a vertical axis perpendicular to the ground surface. In some embodiments, inner walls 418 may be angled. Inner walls 418 may be angled towards the central region of the member at about the same angle as the outer walls 416 in certain embodiments, yet in further embodiments, inner walls may be angled at a different rate than outer walls 418. In one embodiment, grips 400 rise above the underlying member 402 at about a predetermined distance.

Figure 5:
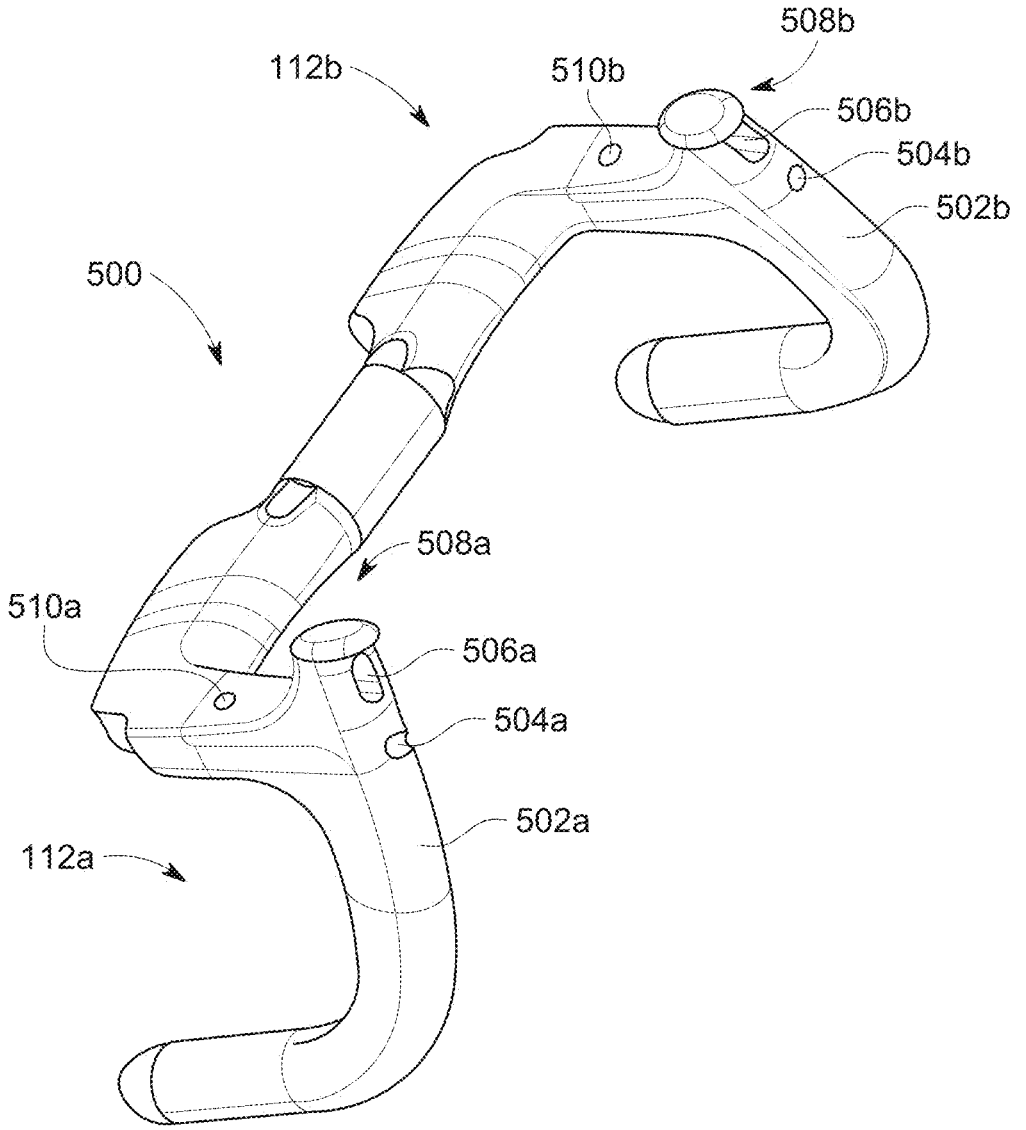
FIG. 5 is a perspective side view of a dropdown handlebar assembly having a different selectable pair of grips in accordance with various embodiments of invention.

FIG. 5 is a perspective side view of a dropdown handlebar assembly having a different selectable pair of grips in accordance with various embodiments of invention. As depicted in FIG. 5, this embodiment may illustrate an alternative configuration of selectively engageable grips that may be utilized with the central body and drop portions described in previous figures.

The drop handlebar assembly 500 comprises a central body and two drop down portions 112a and 112b, which may be similar or identical to those described in relation to previous figures. The drop handlebar assembly 500 may further include a plurality of grips, represented in this embodiment by a first grip 502a and a second grip 502b. The first grip 502a is shown mounted on the right side of the drop handlebar assembly 500, while second grip 502b is mounted on the left side. These grips 502a and 502b may be configured to replicate a road bike hood grip position, providing a comfortable and familiar hand placement for riders. The grips 502a and 502b may be configured to be selectively engaged with the drop down portions 112a and 112b, allowing users to customize their handlebar setup based on personal preference or intended use.

Each grip 502a and 502b may feature a design that incorporates several functional elements. At the top of each grip may be a hook structure, represented by top hook structures 508a and 508b for grips 502a and 502b, respectively. The top hook structures 508a and 508b may be configured to add support for one to two fingers, allowing the rider to hook their fingers underneath for enhanced grip security. This feature can be particularly beneficial during high-intensity riding or when additional control is desired.

The grips 502a and 502b each include a central void or hole, represented by holes 506a and 506b, respectively. These holes 506a and 506b may serve a dual purpose in the design of the grips. Firstly, they contribute to reducing the frontal area of the handlebar assembly when the rider is positioned in the drops. This reduction in frontal area can potentially improve the aerodynamic performance of the overall bicycle setup. Secondly, the holes 506a and 506b may be designed to energize airflow behind the grip and across the rider's forearm. This feature may contribute to improved cooling and comfort for the rider during extended periods of use.

To secure the grips 502a and 502b to the dropdown portions 112a and 112b, the drop handlebar assembly 500 may incorporate multiple fastening structures. For the first grip 502a, a first fastening structure 504a is provided. This fastening structure 504a may take the form of a hole configured to receive a screw, or it may be designed as a snap fastener or other suitable attachment mechanism. The fastening structure 504a is positioned to provide secure attachment while minimizing interference with the rider's grip.

Similarly, the second grip 502b includes a second fastening structure 504b, which may be identical or similar to the first fastening structure 504a. This second fastening structure 504b serves the same purpose of securely attaching the grip 502b to its corresponding dropdown portion. The positioning and design of these fastening structures 504a and 504b allow for easy installation and removal of the grips, facilitating the selective engagement feature of the handlebar assembly.

In addition to the lower fastening structures, the grips 502a and 502b may also include top fastening structures 510a and 510b, respectively. These top fastening structures 510a and 510b provide additional points of attachment, ensuring a stable and secure connection between the grips and the drop down portions. Like the lower fastening structures 504, these top fastening structures 510a and 510b may be configured as holes for receiving screws, snap fasteners, or other suitable attachment mechanisms.

The inclusion of both lower and top fastening structures (504a/504b and 510a/510b) allows for a more distributed load-bearing attachment, which can enhance the overall stability and durability of the grip installation. This dual-point attachment system can help minimize unwanted movement or rotation of the grips during use, contributing to a more consistent and reliable riding experience.

The design of grips 502a and 502b, with their top hook structures 508a and 508b, central holes 506a and 506b, and multiple fastening points, represents an approach to addressing rider comfort, aerodynamics, and customization. By providing these selectively engageable grips, the handlebar assembly 500 offers users the flexibility to adapt their riding setup to various conditions or preferences, while maintaining the core benefits of a drop handlebar configuration.

Figure 6:
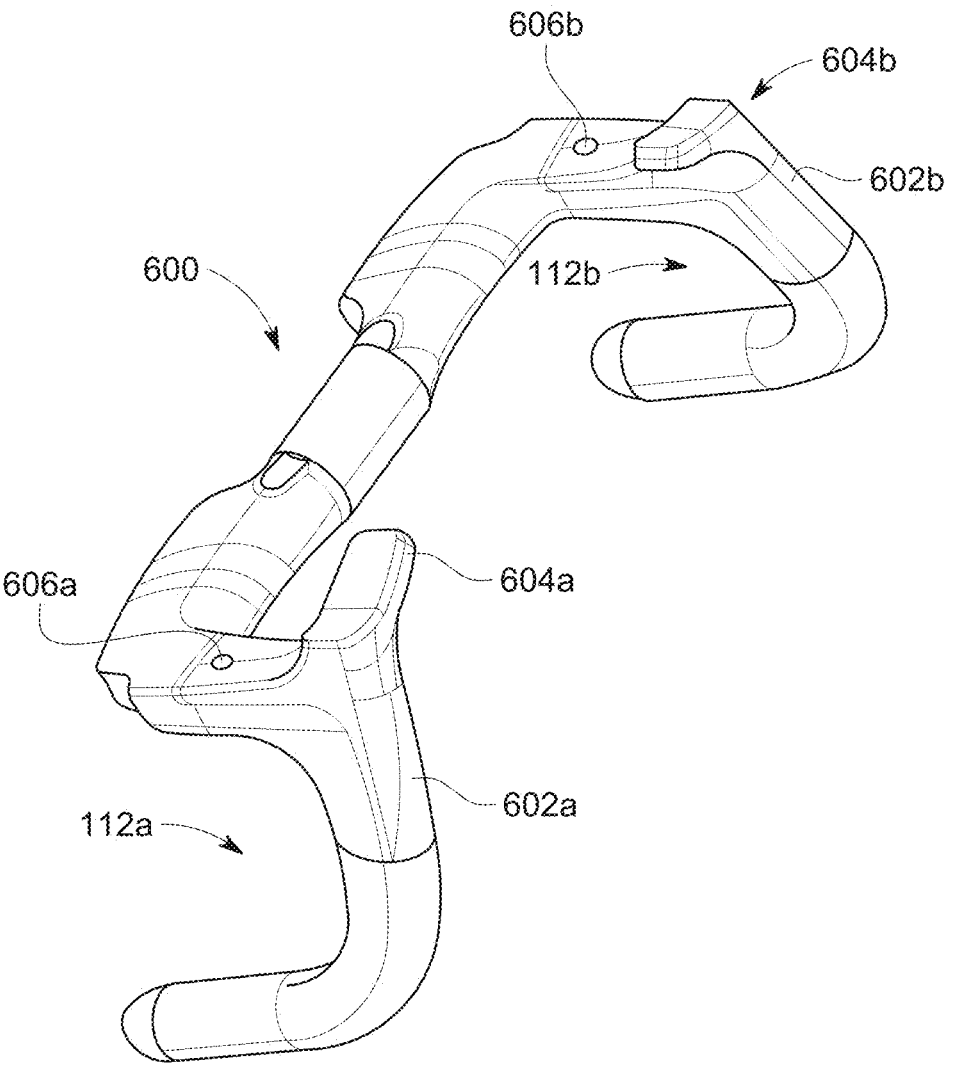
FIG. 6 is a perspective side view of a dropdown handlebar assembly having yet another selectable pair of grips in accordance with various embodiments of the invention.

FIG. 6 is a perspective view of another embodiment of a dropdown handlebar assembly having yet another selectable pair of grips in accordance with various aspects of the present disclosure. The handlebar assembly shown in FIG. 6 builds upon the concepts introduced in previous figures while offering another configuration aimed at improving aerodynamics and rider comfort.

In some embodiments, the handlebar assembly 600 comprises a central body and two drop down portions 112a and 112b, which may be similar or identical to those described in relation to previous figures. The handlebar assembly 600 may further include a plurality of grips, represented in this embodiment by a first grip 602a and a second grip 602b. The first grip 602a is shown mounted on the right side of the handlebar assembly 600, while second grip 602b is mounted on the left side.

In some embodiments, grips 602a and 602b are configured to provide an aggressive narrow position with the hoods angled inward. This configuration allows the rider to grip the handlebars in a sphinx-type position where the rider's fists are clamped horizontally. The grip position is intended to narrow the frontal area of the rider, thereby optimizing aerodynamics. In an alternative variation, the grips 602a and 602b may be designed to be held with the full palm over just the two smallest fingers, providing increased grip support while still maintaining an inward-facing grip that maximizes the UCI geometry limits.

The design of grips 602a and 602b may incorporate a low frontal area and a Kamm aero profiled shape. These features are intended to reduce (e.g., minimize) drag when the rider is using the drops. The shape and positioning of the grips 602a and 602b represent a an approach to balancing aerodynamic efficiency with rider comfort and control.

Each grip 602a and 602b may include a hood structure, represented by hoods 604a and 604b respectively. In some embodiments, hood 604a may be integrated into the design of first grip 602a, while hood 604b may be part of second grip 602b. These hood structures 604a and 604b may be shaped to complement the overall aerodynamic profile of the grips while providing a comfortable and secure hand position for the rider.

In some embodiments, the hoods 604a and 604b may be contoured to allow for a natural hand placement when the rider is in the "hoods" position—a common riding position where the hands rest on top of the hoods. The shape of hoods 604a and 604b may be designed, in certain embodiments, to lend with the brake lever bodies (not shown) that would typically be mounted in this area. This integration of the hood design with the anticipated placement of control components may increase rider comfort when using such a handlebar assembly.

To secure the grips 602a and 602b to the dropdown portions 112a and 112b, the handlebar assembly 600 can incorporate fastening structures. In this embodiment, top fastening structures 606a and 606b are visible for grips 602a and 602b respectively. The top fastening structure 606a may take the form of a hole configured to receive a screw, or it may be designed as a snap fastener or other suitable attachment mechanism. Similarly, top fastening structure 606b serves the same purpose for grip 602b. These top fastening structures 606a and 606b may be positioned to provide secure attachment while minimizing interference with the rider's grip. The placement of these fastening structures may allow for easy installation and removal of the grips, facilitating the selective engagement feature of the handlebar assembly. Accordingly, riders can customize their handlebar setup based on personal preference or intended use.

It should be noted that while top fastening structures 606a and 606b are depicted in FIG. 6, additional fastening structures may be incorporated into the design. These additional structures could be located at different points on the grips or the dropdown portions to ensure a stable and secure connection. The use of multiple fastening points would allow for a more distributed load-bearing attachment, enhancing the overall stability and durability of the grip installation.

The design of handlebar assembly 600, with its aerodynamically optimized grips 602a and 602b, integrated hoods 604a and 604b, and fastening structures 606a and 606b, represents an approach to addressing rider comfort, aerodynamics, and customization. By providing these selectively engageable grips, the handlebar assembly 600 offers users the flexibility to adapt their riding setup to various conditions or preferences, while maintaining the core benefits of a drop handlebar configuration.

Figure 7:
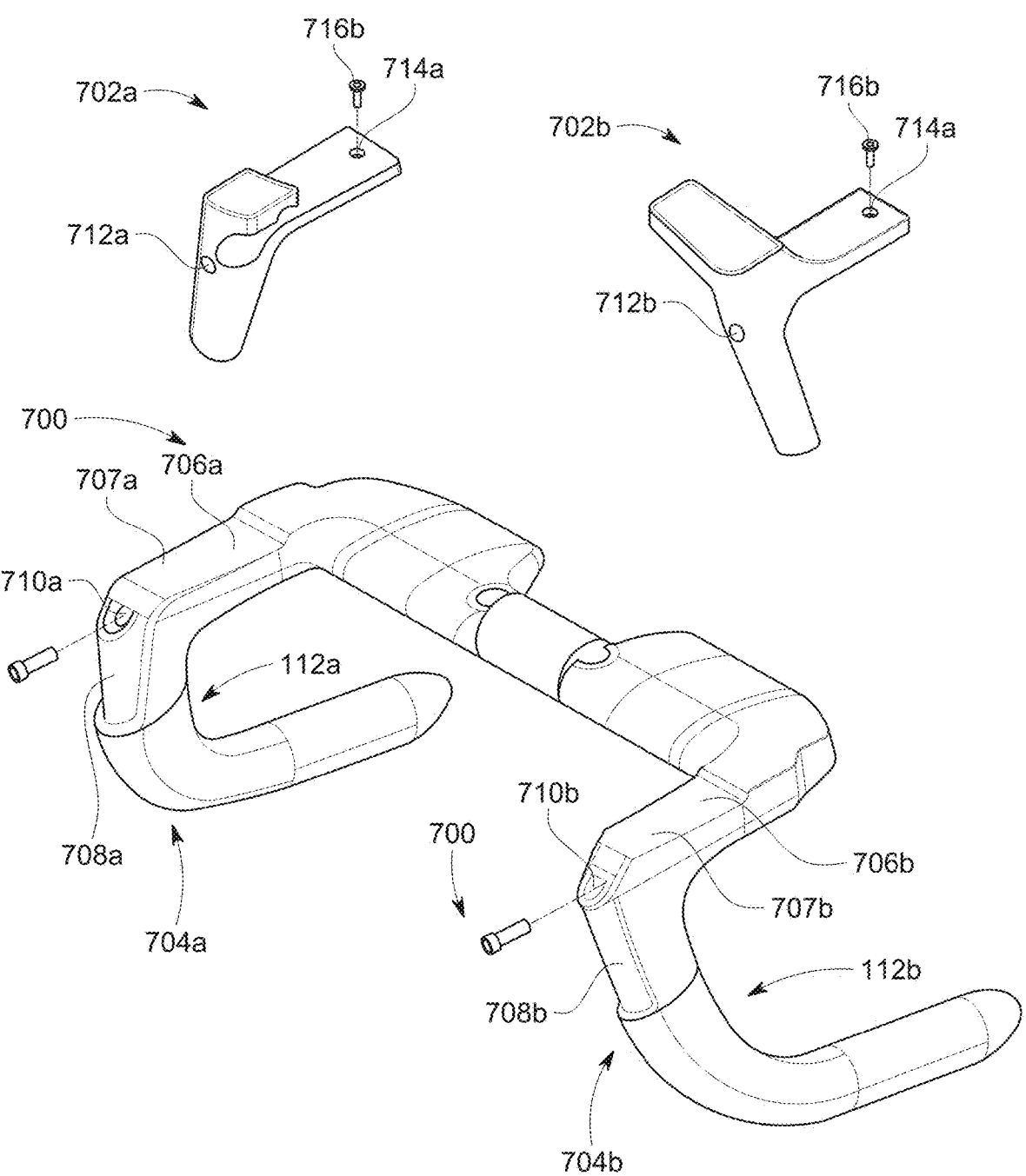
FIG. 7 is a perspective view of an illustrative grip that may be utilized with a central body, such as one or more central bodies disclosed herein.

FIG. 7 illustrates an exploded perspective view of another embodiment of a handlebar assembly 700 in accordance with aspects of the present disclosure. The handlebar assembly 700 builds upon the concepts introduced in previous figures while offering another configuration aimed at improving aerodynamics and rider comfort.

In some embodiments, the handlebar assembly 700 comprises a central body and two drop down portions 112a and 112b, which may be similar or identical to those described in relation to previous figures. The handlebar assembly 700 further includes a plurality of grips, represented in this embodiment by a first grip 702a and a second grip 702b. The first grip 702a is shown as a right-side grip, while second grip 702b is shown as a left-side grip. In embodiments, grips 702a and 702b may be configured to provide an aggressive narrow position with the hoods angled inward. The design of grips 702a and 702b may incorporate a low frontal area and a Kamm aero profiled shape. These features may minimize or reduce drag when the rider is using the drops.

In some embodiments, to secure the grips 702a and 702b to the dropdown portions 112a and 112b, the handlebar assembly 700 may incorporate multiple fastening structures. For the first grip 702a, a top fastening structure 706a may be used. This fastening structure 706a may take the form of a hole configured to receive a screw, or it may be designed as a snap fastener or other suitable attachment mechanism. The fastening structure 706a can be positioned to provide secure attachment while minimizing interference with the rider's grip.

The top fastening structure 706a may work in combination with an additional fastening structure 714a and a fastener 716a, such as a screw. This combination of fastening elements allows for a distributed load-bearing attachment, enhancing the overall stability and durability of the grip installation. The positioning of these fastening structures allows for easy installation and removal of the grips, facilitating the selective engagement feature of the handlebar assembly.

Similarly, the second grip 702b includes a top fastening structure 706b, which may be identical or similar to the top fastening structure 706a. This top fastening structure 706b serves the same purpose of securely attaching the grip 702b to its corresponding dropdown portion. Like its counterpart, the top fastening structure 706b may work in conjunction with a fastening structure 714b and a fastener 716b to ensure a stable connection.

It should be noted that while top fastening structures 706a and 706b are depicted in FIG. 7, additional fastening structures may be incorporated into the design. For example, a fastening structure may include a combination of fastening structure 710a and 712a and 720 for grip 702a. Similarly, a fastening structure may include a combination of fastening structure 710b and 712b and/or 720 for grip 702b. These additional fastening points provide further options for securing the grips to the dropdown portions, allowing for customization based on rider preference or specific use cases. The dropdown portions 112a and 112b feature top surfaces 707a and 707b respectively. These top surfaces may be designed to interface smoothly with the corresponding surfaces of the grips 702a and 702b, ensuring a comfortable and ergonomic grip for the rider.

In some embodiments, each of the dropdown portions 112a and 112b include a recessed convex portion, represented by recessed convex portions 708a and 708b respectively. These recessed convex portions may be designed to accommodate specific features of the grips 702a and 702b, enhancing the fit and stability of the grip installation. The recessed convex portions 708a and 708b may also contribute to the overall aerodynamic profile of the handlebar assembly. The recessed convex portions 708a and 708b may be shaped to complement the contours of the grips 702a and 702b. This complementary shaping can help distribute the forces applied by the rider's hands more evenly across the grip and dropdown portion interface. Additionally, the recessed convex portions may provide a visual and tactile guide for correct grip placement during installation.

A fastener 720, such as a screw, is shown in FIG. 7. This fastener may be used in conjunction with various fastening structures described earlier to secure the grips to the dropdown portions. The fastener 720 may be designed to be easily accessible for installation and removal, yet remain unobtrusive during use to maintain the handlebar assembly's aerodynamic properties and avoid interfering with the rider's grip. The use of fastener 720 in combination with the various fastening structures (e.g., 710a/b, 712a/b, 714a/b, 706a/b) provides flexibility in how the grips are secured to the dropdown portions. This flexibility allows for fine-tuning of the grip position and security, catering to individual rider preferences and different riding styles or conditions.

In one embodiment, an installation process of the grip begins with the preparation of the vehicle frame, specifically the stem area where the handlebar assembly will be mounted. This may involve removing any pre-existing handlebar components and ensuring the stem area is clean and free from debris.

The central body of the handlebar assembly, which may include integrally formed drop portions (112a, 112b), is then positioned onto the stem of the vehicle. In some embodiments, a thin layer of a friction-increasing substance, such as grease for metal components or a specialized carbon assembly paste for carbon fiber components, may be applied to the contact surfaces to prevent slippage and reduce the risk of damage from overtightening.

The central body is initially secured to the stem using a faceplate and associated fasteners, which are left in a loosened state to allow for subsequent adjustments. This initial securing step ensures the central body remains in place during the remainder of the installation process while still allowing for fine-tuning of its position.

Next, an installer selects the desired pair of grips (702a, 702b) from a plurality of available grip options. The selection of grips may be based on the intended use of the vehicle, rider preference, or other factors. The right grip (702a) is aligned with the right drop portion (112a) of the central body. Critical to this alignment is ensuring that the fastening structures (706a, 714a) of the grip correspond precisely with their respective attachment points on the drop portion.

Once aligned, the right grip (702a) can be secured to the drop portion using fasteners (716a) that engage with the fastening structures (714a, 714a). In one embodiment, these fasteners are initially hand-tightened to allow for minor adjustments if needed. The process is then repeated for the left grip (702b), aligning it with the left drop portion (112b) and securing it using fasteners (716b) through the corresponding fastening structures (706b, 714b).

After both grips are in place, an installer performs a comprehensive check of the overall alignment and positioning of the handlebar assembly. This may involve ensuring the assembly is centered relative to the stem and positioned at the desired angle for optimal rider comfort and control. Adjustments can be made as necessary at this stage. Once the desired position is achieved, all fasteners are tightened to their specified torque values using a calibrated torque wrench. This includes the stem faceplate bolts as well as the grip fasteners (716a, 716b). The use of a torque wrench ensures that the fasteners are tightened sufficiently to prevent movement during use, while avoiding over-tightening that could damage the components.

In some embodiments, the installation process may further include the mounting of auxiliary components such as brake levers, gear shifters, or other control mechanisms. These components are typically positioned according to rider preference or standard ergonomic guidelines. The final step in the installation process involves a thorough inspection of all fasteners and components to ensure proper tightening and stability. This may include a physical check of the grips to confirm they are securely attached to the drop portions.

It should be noted that while this installation process is described in the context of the specific handlebar assembly illustrated in FIG. 7, the general principles and steps may be applicable to other similar handlebar assemblies with selectively engageable grip components.

Figure 8:
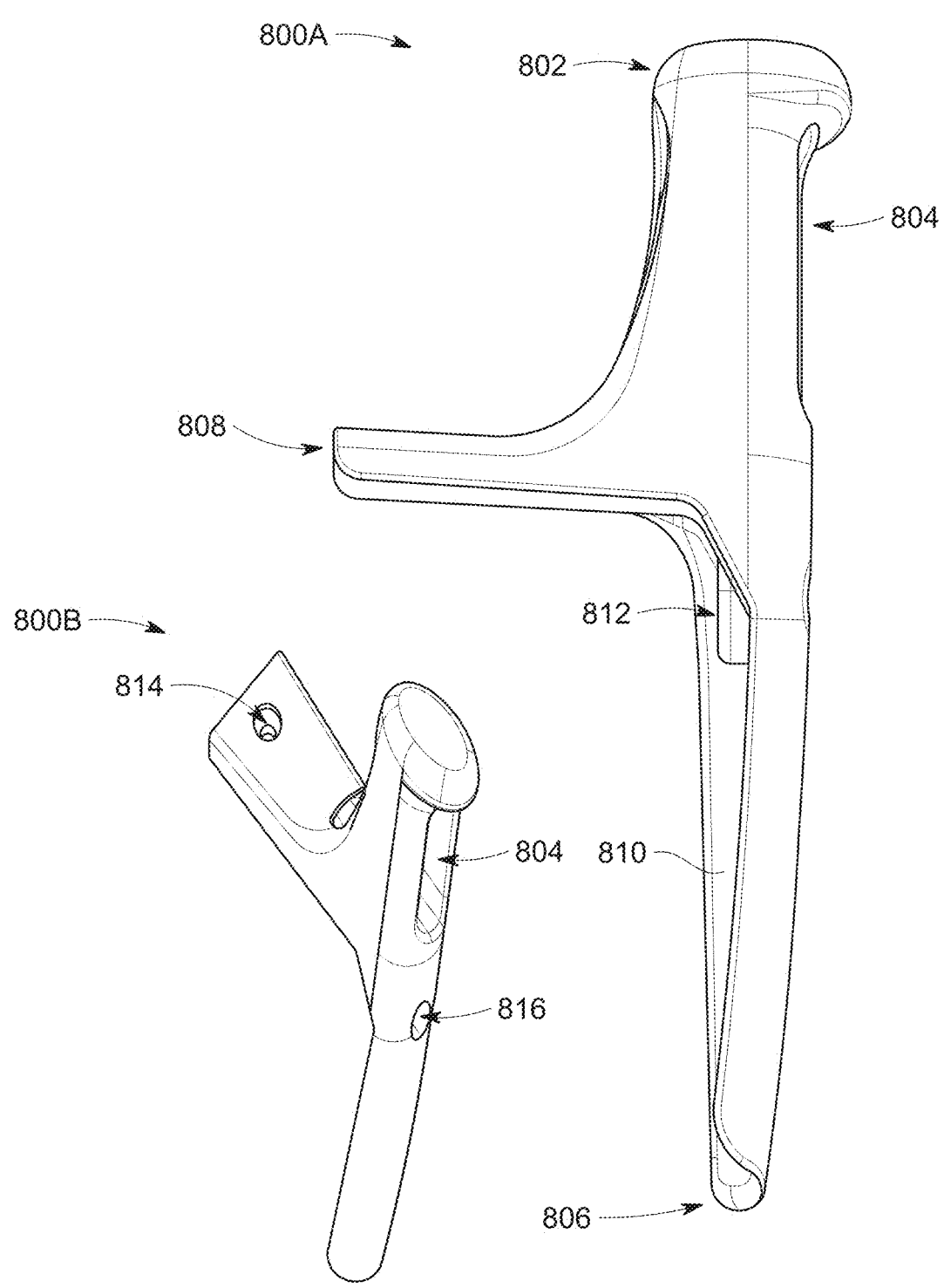
FIG. 8. is a perspective view of another illustrative grip that may be utilized with a central body, such as one or more central bodies disclosed herein.

FIG. 8 illustrates another embodiment of a grip that may be utilized with the central body and drop portions described in previous figures. FIG. 8 provides two views of an example grip 800, with 800A depicting a first view and 800B depicting a second view. In some embodiments, the grip 800 is configured to be selectively engaged with the drop portions of a handlebar assembly, offering users an option for customizing their riding experience.

In some embodiments, the grip 800 features a hook structure 802 at its upper portion. This hook structure 802 may be configured to provide additional support and security for the rider's hand when gripping the handlebar. The shape of the hook structure 802 allows one or more of the rider's fingers to wrap around it, enhancing control and stability during various riding conditions. The hook structure 802 may be contoured to ergonomically fit the natural curvature of a rider's fingers, potentially reducing hand fatigue during extended rides.

In some embodiments, located below the hook structure 802 is a hole 804. This hole 804 may serve multiple purposes in the design of the grip 800. One function of the hole 804 is to reduce the overall weight of the grip, contributing to a lighter overall handlebar assembly. Additionally, the hole 804 may aid in airflow around the grip and the rider's hand, potentially improving cooling and comfort during use. The size and shape of the hole 804 may be optimized to balance these benefits with the structural integrity and grip functionality of the overall design.

The bottom portion 806 of the grip 800 is designed to interface with the drop portion of the handlebar. This bottom portion 806 may be shaped to complement the curvature of the drop section, ensuring a secure and stable connection. The bottom portion 806 may also incorporate features that enhance the grip's aerodynamic properties when installed on the handlebar assembly. The design of the bottom portion 806 may allow for a smooth transition between the grip and the drop section, minimizing air turbulence and potential drag.

In some embodiments, element 808 represents an end portion of the grip 800 and is configured to engage with the channel 208 of the transition section, as described in previous figures. Element 808 may be shaped to complement the dimensions and contours of channel 208. When the grip 800 is installed, element 808 may fit into channel 208, creating a stable connection between the grip and the drop portion. The specific shaping of the element 808 ensures that it aligns correctly within channel 208, which helps to properly orient the entire grip 800 on the handlebar. This engagement between element 808 and channel 208 helps to prevent unwanted movement or rotation of the grip during use, enhancing the overall stability and control for the rider.

An inside portion 810 of the grip 800 is configured to contact the surface of the drop portion, such as surfaces 708a/708b described in previous figures. This inside portion 810 may be shaped to closely match the contours of the drop portion, ensuring a snug fit and minimizing any potential movement or rotation of the grip during use. The inside portion 810 may also incorporate textured or high-friction areas to further enhance the stability of the connection between the grip and the drop portion.

The grip 800 may incorporate a fastening structure with both internal and external interfaces, represented by elements 812 and 816 respectively. Element 812 depicts the internal interface of this fastening structure, which may be in the form of a threaded insert, a mounting point, or a specially designed receptacle located within the body of the grip 800. This internal interface 812 may be configured to receive and securely hold a fastener, such as a screw or bolt, that will be used to attach the grip to the drop portion of the handlebar.

Correspondingly, element 816 represents the external interface of the same fastening structure. It may appear as a hole, a recessed area, or a specially shaped opening on the surface of the grip 800. The external interface 816 may be configured to allow access to the internal interface 812, enabling the insertion or removal of the fastener that secures the grip to the handlebar. Together, the internal interface 812 and external interface 816 form a complete fastening structure that allows for secure attachment of the grip 800 to the drop portion of the handlebar, while also facilitating easy installation and removal when needed.

A second fastening structure 814 is also incorporated into the design of grip 800. This fastening structure 814 may work in conjunction with fastening structure 812 to provide a multi-point attachment system. The use of multiple fastening points helps distribute the forces applied to the grip during riding, enhancing overall stability and durability. Fastening structure 814 may be positioned at a different angle or orientation compared to fastening structure 812, allowing for a more comprehensive and secure attachment to the drop portion of the handlebar.

Figure 9:
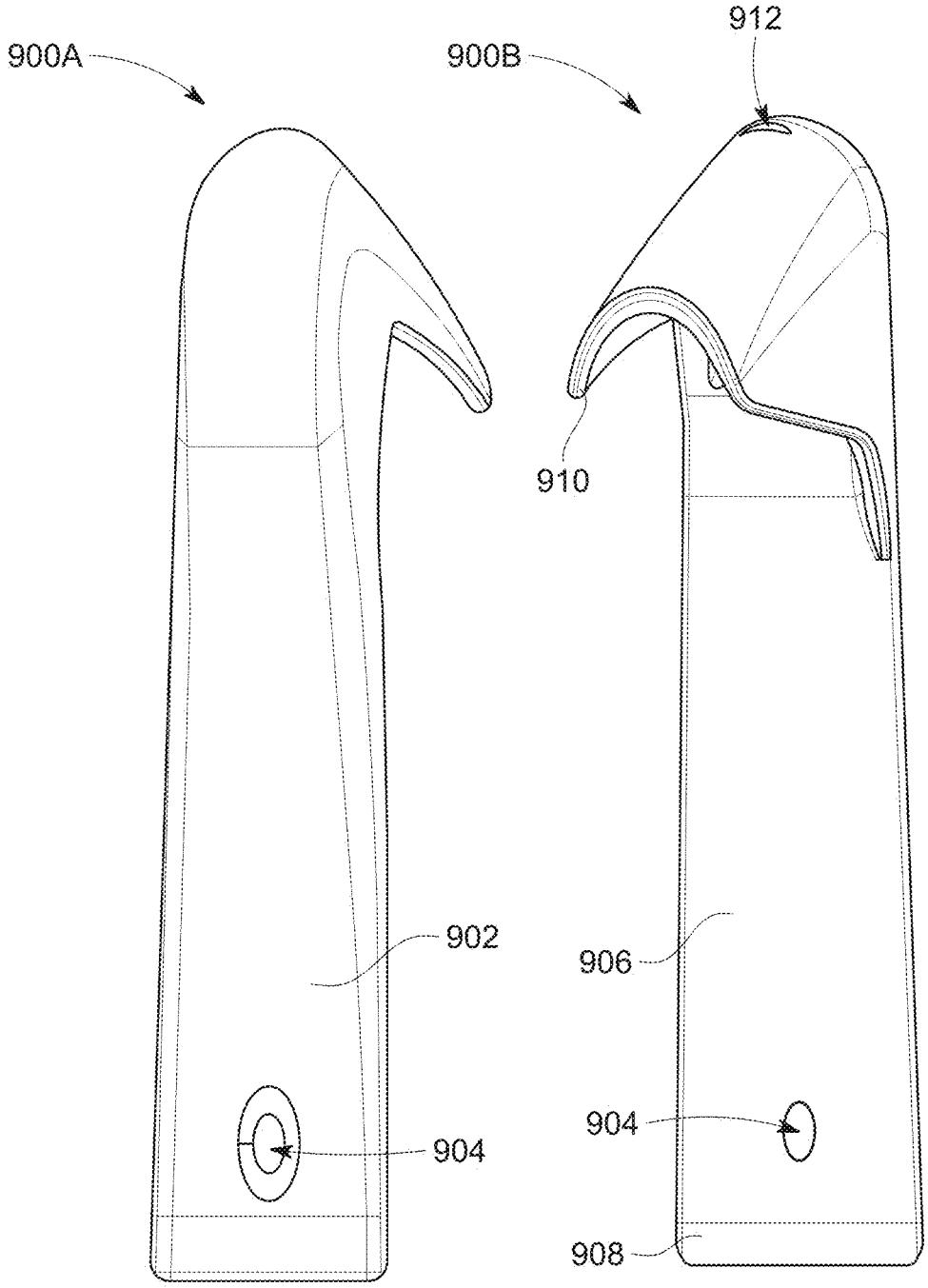
FIG. 9 is a perspective view of yet another illustrative grip that may be utilized with a central body, such as one or more central bodies disclosed herein.

FIG. 9 illustrates another embodiment of a grip that may be utilized with the central body and drop portions described in previous figures. FIG. 9 provides two views of an example grip 900, with 900A depicting a first view and 900B depicting a second view. The grip 900 is configured to be selectively engaged with the drop portions of a handlebar assembly, offering users an option for customizing their riding experience with a more traditional hood-style grip.

In some embodiments, the grip 900 features a low-profile design primarily intended to cap off the mounting recess of the drop portion, creating a flush finish when installed. This design approach may maintain a streamlined appearance while providing functional benefits to the rider. The overall shape of grip 900 can be contoured to complement the curvature of the drop portion, ensuring a seamless integration with the handlebar assembly. A top surface 902 of the grip 900 can incorporate a shallow hump or raised portion. This feature provides support for the rider's hand, particularly during recovery periods or when a more relaxed grip is desired. The low-profile nature of this hump may be intentional, designed to offer comfort without protruding excessively into the rider's grip space. This balance between support and minimal interference allows riders to easily transition between different hand positions on the handlebar.

The top surface 902 may gradually slope towards the rear of the grip, creating a smooth transition to the drop portion of the handlebar. This sloping design may contribute to improved aerodynamics by reducing air turbulence around the grip area. Additionally, the contoured shape of top surface 902 may enhance the overall ergonomics of the grip, potentially reducing hand fatigue during extended rides. In some embodiments, a fastening structure 904 is incorporated into the design of grip 900 to secure it to the drop portion of the handlebar. This fastening structure may take the form of a hole or slot designed to accommodate a fastener such as a screw or bolt.

The fastening structure 904 may be recessed into the body of the grip to maintain the overall smooth profile of the grip surface. This recessed design helps prevent any protruding hardware from causing discomfort to the rider's hands. The depth and diameter of the fastening structure 904 may be optimized to ensure a strong connection to the drop portion while allowing for easy installation and removal of the grip. In some embodiments, a rear surface 906 of the grip 900 is configured to contact or otherwise engage with surfaces 708a/708b of the drop portions described in previous figures. This rear surface 906 may be shaped to closely match the contours of the drop portion, ensuring a snug fit and minimizing any potential movement or rotation of the grip during use.

The rear surface 906 may incorporate textured or high-friction areas to further enhance the stability of the connection between the grip and the drop portion. These textured areas could be strategically placed to maximize grip without adding unnecessary material or weight to the overall design. The interface between rear surface 906 and the drop portion may also be designed to channel away any moisture or debris, maintaining a secure connection even in challenging riding conditions.

In some embodiments, a lower portion 908 of the grip 900 can be configured to contact the top surface 202 and/or channel 208 of the drop portion. This area of contact ensures proper alignment and positioning of the grip on the handlebar assembly. The shape of lower portion 908 may be designed to create a smooth transition between the grip and the drop portion, minimizing any gaps or discontinuities that could affect aerodynamics or rider comfort.

The lower portion 908 may also incorporate features that enhance the grip's aerodynamic properties when installed on the handlebar assembly. These features could include subtle channels or contours that help manage airflow around the grip area. The design of lower portion 908 allows for a seamless integration with the drop portion, creating a unified appearance and feel for the rider. An upper portion 910 of the grip 900 can be configured to contact the recessed convex portion 312 and/or the apex 314 or channel 316 of the drop portion. This area of contact provides additional stability and support for the grip, particularly when the rider is applying force during intense riding conditions. The shape of upper portion 910 complements the curvature of the drop portion, ensuring a secure and comfortable grip for the rider.

The upper portion 910 may feature subtle contouring or shaping to guide the rider's hand into an optimal position on the grip. This ergonomic design can help reduce hand fatigue and improve control, especially during long rides or challenging terrain. The interface between upper portion 910 and the drop portion may also be designed to disperse forces evenly, enhancing the overall durability of the grip and handlebar assembly.

A second fastening structure 912 may be incorporated into the grip 900. This fastening structure may work in conjunction with fastening structure 904 to provide a multi-point attachment system. The use of multiple fastening points helps distribute the forces applied to the grip during riding, enhancing overall stability and durability. Fastening structure 912 may be positioned at a different angle or orientation compared to fastening structure 904, allowing for a more comprehensive and secure attachment to the drop portion of the handlebar. The design of fastening structure 912 may be similar to that of fastening structure 904, featuring a recessed configuration to maintain the smooth outer profile of the grip.

Example Clauses

Implementation examples are described in the following numbered clauses:

Clause 1: A handlebar assembly, comprising: a central body extending along a first horizontal axis for a first length from a first end to a second end; a first drop body integrally formed with the central body and extending from the first end, the first drop body comprising a first transition section and a first drop section; a second drop body integrally formed with the central body and extending from the second end, the second drop body comprising a second transition section and a second drop section; and a pair of selectively engageable grips, each grip configured to be removably attached to a respective drop body.

Clause 2: The handlebar assembly of clause 1, wherein the central body comprises a midsection configured to be removably mounted to a portion of a vehicle frame.

Clause 3: The handlebar assembly of any one of clauses 1-2, wherein the central body comprises a non-circular cross-section along a majority of the first length.

Clause 4: The handlebar assembly of any one of clauses 1-3, wherein the central body comprises an asymmetrical top surface with respect to its distribution across the first length.

Clause 5: The handlebar assembly of any one of clauses 1-4, wherein the first transition section extends along a second horizontal axis substantially perpendicular to the first horizontal axis.

Clause 6: The handlebar assembly of any one of clauses 1-5, wherein the first drop section extends along a vertically oriented axis.

Clause 7: The handlebar assembly of any one of clauses 1-6, wherein each of the first and second drop bodies comprises a recessed convex portion.

Clause 8: The handlebar assembly of any one of clauses 1-7, wherein each grip of the pair of selectively engageable grips comprises a proximate rear surface configured to be received within a channel of the respective drop body.

Clause 9: The handlebar assembly of any one of clauses 1-8, wherein each grip of the pair of selectively engageable grips comprises a distal rear surface configured to be received by a convex portion of the respective drop body.

Clause 10: The handlebar assembly of any one of clauses 1-9, wherein the pair of selectively engageable grips comprises a hook structure configured to provide support for one or more fingers of a rider.

Clause 11: The handlebar assembly of any one of clauses 1-10, wherein each grip of the pair of selectively engageable grips comprises a central void configured to reduce frontal area of the handlebar assembly.

Clause 12: A handlebar system, comprising: a central member extending along a first axis; first and second dropdown portions integrally formed with the central member and extending from opposite ends of the central member; and a plurality of pairs of grips, each pair configured for selective engagement with the first and second dropdown portions to form different handlebar configurations.

Clause 13: The handlebar system of clause 12, wherein the central member comprises carbon fiber.

Clause 14: The handlebar system of any one of clauses 12-13, wherein each of the first and second dropdown portions comprises a transition section extending along a second axis incongruent with the first axis.

Clause 15: The handlebar system of any one of clauses 12-14, wherein each of the first and second dropdown portions comprises a drop section extending along a vertically oriented axis.

Clause 16: The handlebar system of any one of clauses 12-15, wherein the central member comprises an asymmetrical top surface.

Clause 17: The handlebar system of any one of clauses 12-16, wherein each pair of grips from the plurality of pairs of grips is configured to provide a different hand position when engaged with the first and second dropdown portions.

Clause 18: The handlebar system of any one of clauses 12-17, wherein at least one pair of grips from the plurality of pairs of grips comprises a hook structure for finger support.

Clause 19: The handlebar system of any one of clauses 12-18, wherein at least one pair of grips from the plurality of pairs of grips comprises a central void configured to reduce frontal area of the handlebar system.

Clause 20: The handlebar system of any one of clauses 12-19, wherein each of the first and second dropdown portions comprises a channel configured to receive a portion of a grip.

Clause 21: The handlebar system of any one of clauses 12-20, wherein each of the first and second dropdown portions comprises a recessed convex portion configured to interface with a portion of a grip.

Clause 22: The handlebar system of any one of clauses 12-21, wherein at least one pair of grips from the plurality of pairs of grips is configured to provide an aggressive narrow position with hoods angled inward when engaged with the first and second dropdown portions.

Clause 23: A handlebar assembly, comprising: a central body extending along a first horizontal axis for a first length from a first end to a second end, the central body having an asymmetrical top surface with respect to its distribution across the first length; a first drop body integrally formed with the central body and extending from the first end, the first drop body comprising a first transition section and a first drop section; a second drop body integrally formed with the central body and extending from the second end, the second drop body comprising a second transition section and a second drop section; and a pair of selectively engageable grips, each grip configured to be removably attached to a respective drop body.

Clause 24: The handlebar assembly of clause 23, wherein the central body comprises a midsection configured to be removably mounted to a portion of a vehicle frame.

Clause 25: The handlebar assembly of clause 24, wherein the central body comprises a non-circular cross-section along a majority of the first length outside the midsection.

Clause 26: The handlebar assembly of any one of clauses 23-25, wherein the asymmetrical top surface comprises a leading edge and a trailing edge, the trailing edge having an asymmetrical curvature relative to the first horizontal axis.

Clause 27: The handlebar assembly of any clause 26, wherein the asymmetrical curvature of the trailing edge creates a reduced area on one side of the central body relative to the other side.

Clause 28: The handlebar assembly of clause 27, wherein the reduced area is configured to allow placement of a human thumb while remaining fingers grip the central body.

Clause 29: The handlebar assembly of any one of clauses 23-28, wherein the first transition section extends along a second horizontal axis substantially perpendicular to the first horizontal axis.

Clause 30: The handlebar assembly of clause 29, wherein the first drop section extends along a vertically oriented axis divergent from a corresponding axis of the second drop section.

Clause 31: The handlebar assembly of any one of clauses 23-30, wherein each of the first and second drop bodies comprises a recessed convex portion.

Clause 32: The handlebar assembly of clause 29, wherein each grip of the pair of selectively engageable grips comprises a distal rear surface configured to be received by the recessed convex portion of the respective drop body.

Clause 33: The handlebar assembly of clause 32, wherein each grip of the pair of selectively engageable grips comprises a central void configured to reduce frontal area of the handlebar assembly.

Clause 34: A handlebar system, comprising: an asymmetrical central member extending along a first axis, the asymmetrical central member having a top surface with varying widths across its length; first and second dropdown portions integrally formed with the asymmetrical central member and extending from opposite ends of the asymmetrical central member; and a plurality of pairs of grips, each pair configured for selective engagement with the first and second dropdown portions to form different handlebar configurations.

Clause 35: The handlebar system of clause 34, wherein the asymmetrical central member comprises carbon fiber.

Clause 36: The handlebar system of any one of clauses 34-35, wherein the top surface of the asymmetrical central member comprises a leading edge and a trailing edge, the trailing edge having an asymmetrical curvature relative to the first axis.

Clause 37: The handlebar system of clause 36, wherein the asymmetrical curvature of the trailing edge creates a reduced area on one side of the asymmetrical central member relative to the other side.

Clause 38: The handlebar system of clause 37, wherein the reduced area is configured to allow placement of a human thumb while remaining fingers grip the asymmetrical central member.

Clause 39: The handlebar system of any one of clauses 34-38, wherein each of the first and second dropdown portions comprises a transition section extending along a second axis incongruent with the first axis.

Clause 40 The handlebar system of clause 39, wherein each of the first and second dropdown portions comprises a drop section extending along a vertically oriented axis.

Clause 41: The handlebar system of clause 40, wherein at least one pair of grips from the plurality of pairs of grips is configured to provide a different hand position when engaged with the first and second dropdown portions.

Clause 42: The handlebar system of clause 41, wherein at least one pair of grips from the plurality of pairs of grips comprises a hook structure for finger support.

Clause 43: The handlebar system of clause 42, wherein at least one pair of grips from the plurality of pairs of grips comprises a central void configured to reduce frontal area of the handlebar system.

Clause 44: The handlebar system of clause 43, wherein at least one pair of grips from the plurality of pairs of grips is configured to provide an aggressive narrow position with hoods angled inward when engaged with the first and second dropdown portions.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Reference to an element in the singular is not intended to mean only one unless specifically so stated, but rather "one or more." For example, reference to an element unless otherwise specifically stated, should be understood to refer to one or more elements. The terms "set" and "group" are intended to include one or more elements, and may be used interchangeably with "one or more." Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions. Unless specifically stated otherwise, the term "some" refers to one or more.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A drop handlebar assembly configured to be removably mounted on a human-powered vehicle, the assembly having:
   a central body extending along a first horizontal axis for a first length from a first end and an opposing second end, the central body further characterized by a mid-section with respect to the first length configured to be removably mounted to a vehicle frame;
   a first drop body having a transition section and a drop section, the transition section being integrally formed and extending from the first end of the central body along a first direction of a second horizontal axis incongruent with the first horizontal axis, and wherein the drop section of the first drop body traverses in a downward direction of a first vertical axis;
   a second drop body having a transition section and a drop section, the transition section of the second drop body being integrally formed and extending from the second end of the central body along a first direction of a third horizontal axis incongruent with the first horizontal axis, and wherein the drop section of the second drop body traverses in a downward direction of a second vertical axis, wherein
      each of the transition sections having a top surface, each top surface comprising a proximal channel and a distal support structure;
      each of the drop sections having a front surface comprising a recessed convex portion proximate to the transition section and a non-recessed convex portion distally located from the respective transition section;
   a plurality of grips configured to be selectively engaged with the drop bodies to form an operating handlebar assembly, wherein each grip of the plurality of grips comprises:
      a proximate rear surface configured to be received within the proximal channel of the respective transition section such that a rear portion of a top surface of the respective grip abuts with the respective end of the central body to form a continuous outer surface; and
      a distal rear surface configured to be received by the recessed convex portion of the respective drop section, such that a distal stop surface completes a continuous outer perimeter with an adjacent portion of the drop section.

2. The drop handlebar assembly of claim 1, wherein at least a portion of the central body has a non-circular cross section.

3. The drop handlebar assembly of claim 1, wherein the second horizontal axis is parallel to the third horizontal axis.

4. The drop handlebar assembly of claim 1, wherein the second horizontal axis and the third horizontal axis are both perpendicular to the first and the second vertical axis.

5. The drop handlebar assembly of claim 1, wherein the first and second drop bodies have identical volumes.

6. The drop handlebar assembly of claim 1, wherein the first and second drop bodies have a general U shape.

7. The drop handlebar assembly of claim 1, wherein the distal support structure of the top surfaces of the drop bodies consists of a flat surface.

8. The drop handlebar assembly of claim 1, wherein each grip of the plurality of grips comprises:

a top surface with a raised portion configured to provide hand support;
   a hook structure at an upper portion of the grip; and
   a hole located below the hook structure, the hole configured to reduce overall weight of the grip and aid in airflow around the grip and a rider's hand.

9. The drop handlebar assembly of claim 1, wherein each grip of the plurality of grips comprises:
   a top surface incorporating a raised portion;
   a rear surface shaped to match contours of the respective drop body; and
   at least two fastening structures positioned at different at least one of angles or orientations and providing a secure attachment to the respective drop body.

10. A handlebar assembly, comprising:
   a central body extending along a first horizontal axis for a first length from a first end to a second end, the central body having an asymmetrical top surface with respect to a distribution of the asymmetrical top surface across the first length;
   wherein the central body comprises a midsection centered between the first end and the second end, wherein the asymmetrical top surface comprises a leading edge and a trailing edge extending along the first length, wherein a first maximum width between the leading edge and the trailing edge between the midsection and the first end is different from a second maximum width between the leading edge and the trailing edge between the midsection and the second end, the first maximum width and the second maximum width measured perpendicular to the first horizontal axis, wherein the first maximum width is located at a first distance from the midsection and the second maximum width is located at a different second distance from the midsection when measured along the first horizontal axis, and wherein the trailing edge defines a first rate of increasing width from the midsection toward the first end and a different second rate of increasing width from the midsection toward the second end;
   a first drop body integrally formed with the central body and extending from the first end, the first drop body comprising a first transition section and a first drop section;
   a second drop body integrally formed with the central body and extending from the second end, the second drop body comprising a second transition section and a second drop section; and
   a pair of selectively engageable grips, each grip configured to be removably attached to a respective one of the first drop body or the second drop body.

11. The handlebar assembly of claim 10, wherein the central body comprises a non-circular cross-section along a majority of the first length outside a midsection.

12. The handlebar assembly of claim 10, wherein the trailing edge includes an asymmetrical curvature relative to the first horizontal axis.

13. The handlebar assembly of claim 12, wherein the asymmetrical curvature of the trailing edge creates a reduced area on one side of the central body relative to an opposing side of the central body.

14. The handlebar assembly of claim 13, wherein the reduced area is configured to allow placement of a human thumb while remaining fingers grip the central body.

15. A handlebar assembly, comprising:
   a central body extending along a first horizontal axis for a first length from a first end to a second end, the central body having an asymmetrical top surface with respect to distribution of the asymmetrical top surface across the first length, wherein:

the central body comprises a midsection centered between the first end and the second end, the asymmetrical top surface comprises a leading edge and a trailing edge extending along the first length, and a first maximum width between the leading edge and the trailing edge between the midsection and the first end is located at a first distance from the midsection and a second maximum width between the leading edge and the trailing edge between the midsection and the second end is located at a different second distance from the midsection when measured along the first horizontal axis, the first maximum width and the second maximum width measured perpendicular to the first horizontal axis;

a first drop body integrally formed with the central body and extending from the first end, the first drop body comprising a first transition section and a first drop section;

a second drop body integrally formed with the central body and extending from the second end, the second drop body comprising a second transition section and a second drop section; and a pair of selectively engageable grips, each grip of the pair of selectively engageable grips configured to be removably attached to a respective one of the first drop body or the second drop body.

16. The handlebar assembly of claim 15, wherein the trailing edge defines a first rate of increasing width from the midsection toward the first end and a different second rate of increasing width from the midsection toward the second end.

17. The handlebar assembly of claim 16, wherein the first maximum width is different from the second maximum width.

18. The handlebar assembly of claim 15, wherein the first maximum width is different from the second maximum width.

19. The handlebar assembly of claim 15, wherein the first distance is at least 2 times greater than the second distance.

\* \* \* \* \*